United States Patent [19]

Schwenninger

[11] 4,185,982

[45] Jan. 29, 1980

[54] METHOD OF MEASURING TEMPERATURE OF A SHEET WITH A NONCONTACTING-TYPE PYROMETER

[75] Inventor: Ronald L. Schwenninger, Ridgeley,, W. Va.

[73] Assignee: PPG Industries, Inc., Pittsburgh, Pa.

[21] Appl. No.: 913,729

[22] Filed: Jun. 7, 1978

[51] Int. Cl.² ............................................. C03B 18/02
[52] U.S. Cl. ......................................... 65/29; 65/158; 65/162; 136/213
[58] Field of Search ........................... 65/29, 158, 162; 136/213

[56] References Cited

U.S. PATENT DOCUMENTS

| | | | |
|---|---|---|---|
| 2,102,955 | 12/1937 | Hulme | 136/213 X |
| 2,433,116 | 12/1947 | Greenbowe et al. | 65/29 X |
| 3,354,720 | 11/1957 | Hager, Jr. | 73/355 |
| 3,400,587 | 9/1968 | Franck | 73/343 |
| 3,957,475 | 5/1976 | Schwenninger et al. | 65/162 X |
| 4,008,062 | 2/1977 | Nishikori et al. | 65/158 |
| 4,114,444 | 9/1978 | Schwenninger et al. | 73/359 R |

OTHER PUBLICATIONS

"Heat Flux Measurements: A Practical Guide," D. R. Hornbaker & D. L. Rall, *Instrumentation Technology*, Feb. 68, pp. 51–56.

American, Society for Testing & Materials Committee E-21 on Space Simulation entitled "Proposed Method for Measuring Heat Flux Using a Circular Foil, 'Gardon,' Calorimeter," Jan. 69, by C. E. Brookley.

*Primary Examiner*—Arthur D. Kellogg
*Attorney, Agent, or Firm*—Donald Carl Lepiane

[57] ABSTRACT

A noncontacting-type pyrometer for measuring the temperature of a glass ribbon has a hot junction at the center of a circular black body adjacent a first surface thereof and a layer of thermal insulating material on the opposite second surface. The radius (a) of the black body, the spacing (b) of the pyrometer from the glass ribbon and the thickness (c) of the black body is selected to satisfy the equation $b < a/5c$ in order that the temperature of the black body as measured by the hot junction is approximately the temperature of the glass ribbon.

7 Claims, 6 Drawing Figures

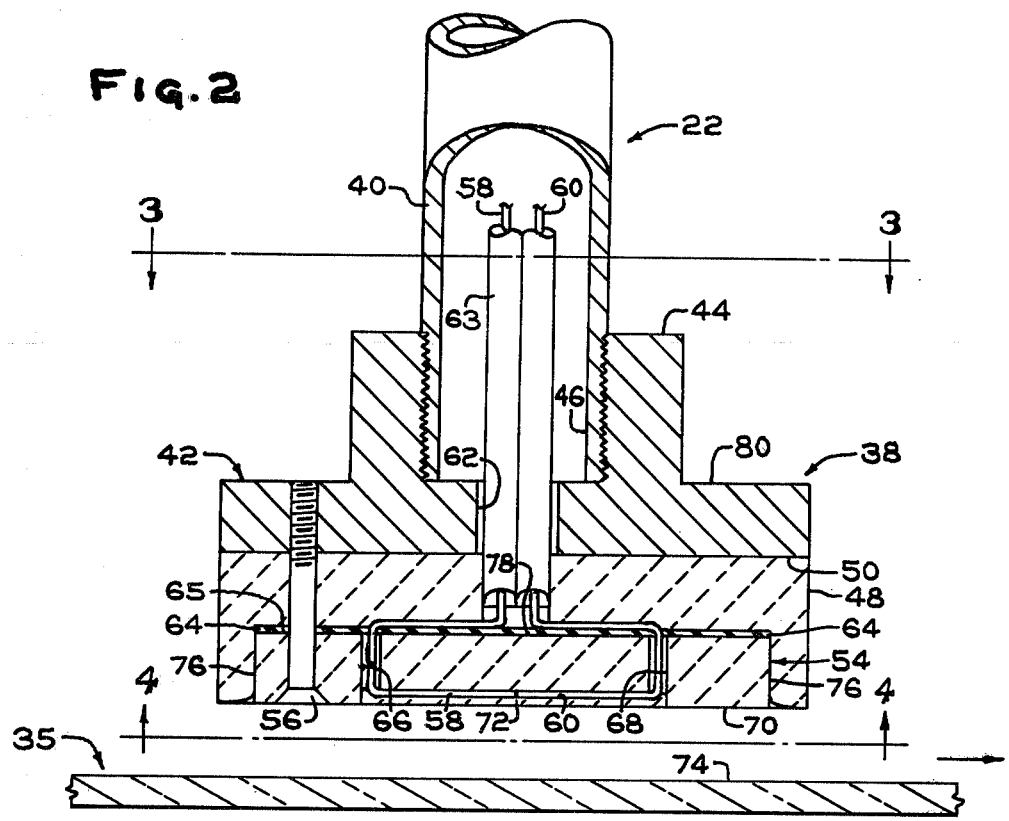
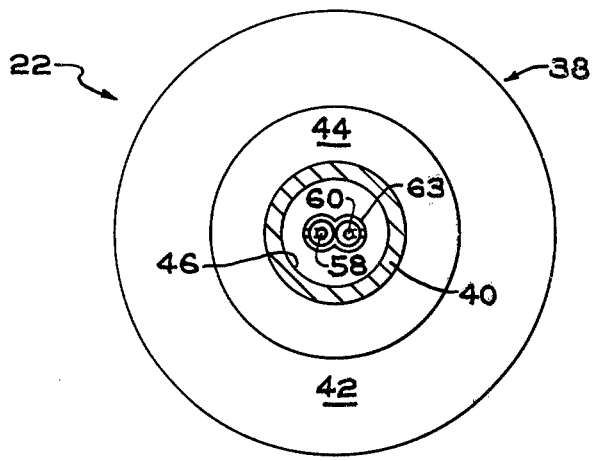
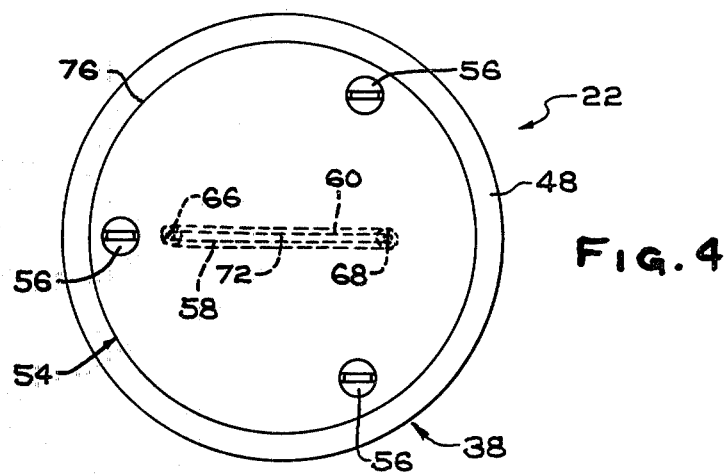

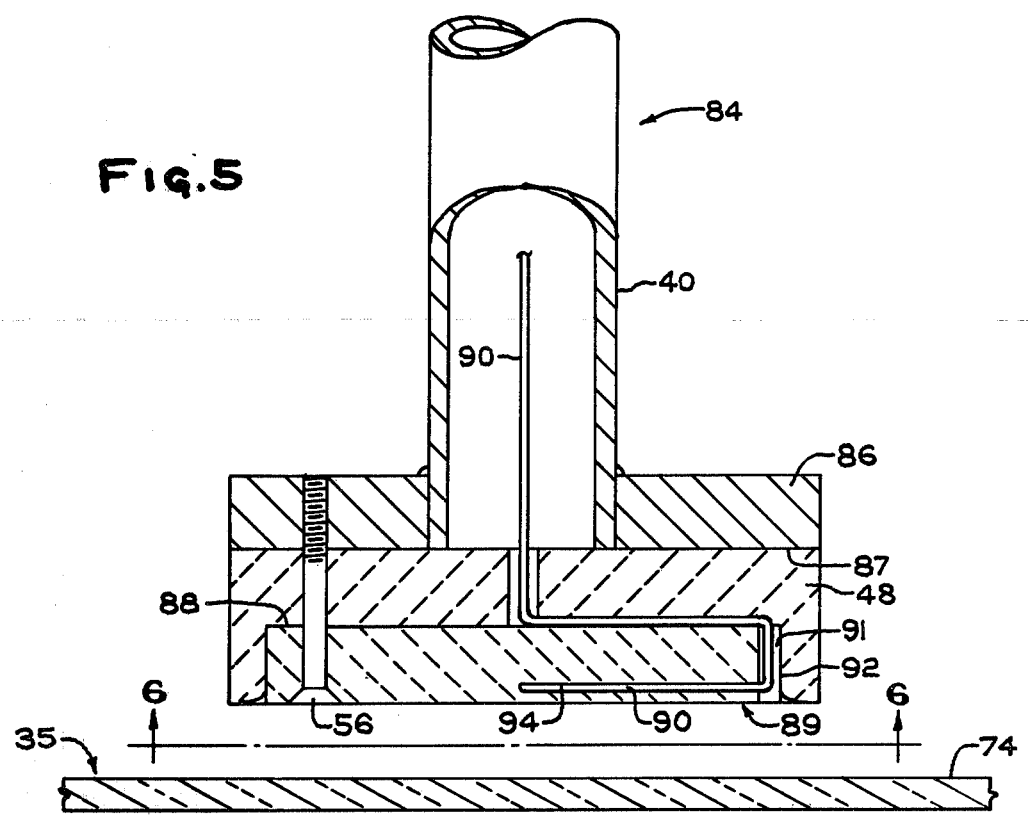
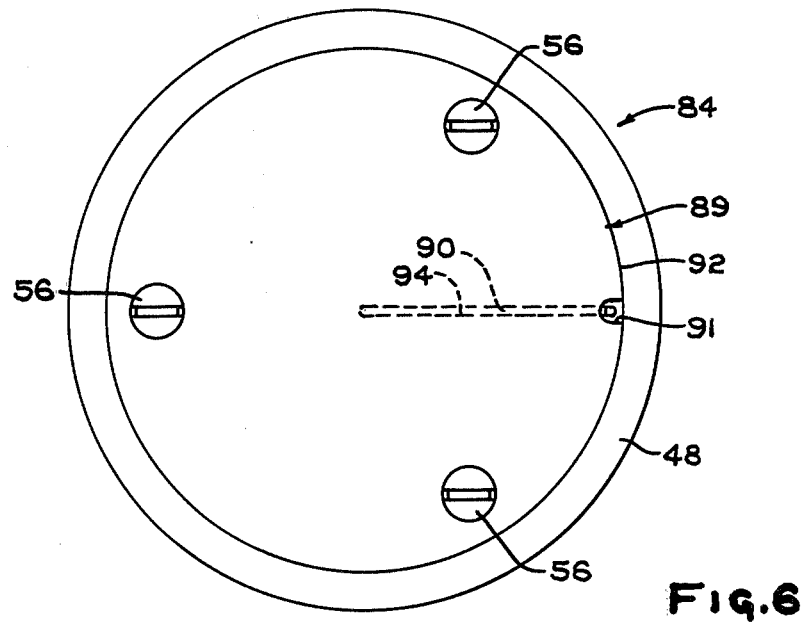

METHOD OF MEASURING TEMPERATURE OF A SHEET WITH A NONCONTACTING-TYPE PYROMETER

DESCRIPTION OF THE INVENTION

1. Field of the Invention

This invention relates to a non-contacting-type pyrometer and, more particularly, to a noncontacting-type pyrometer having a hot junction.

2. Background of the Invention

In general, temperatures of a substrate, for example, a glass ribbon moving through a forming chamber of a flat glassmaking apparatus, may be monitored using contact and noncontact-type pyrometers. Examples of contact-type pyrometers are found in U.S. Pat. Nos. 3,875,799 and 3,957,475; and examples of noncontact-type pyrometers are found in U.S. Pat. Nos. 3,354,720; 3,400,587; and 4,008,062.

The drawback of contact-type pyrometers is that the glass ribbon surface contacted by the pyrometer is marred and unusable. Although the noncontact-type pyrometers eliminate the above problem, there are additional limitations associated therewith. For example, radiation-type pyrometers employ lenses, mirrors or windows to focus or transmit radiation from the ribbon or substrate to the sensing element. These type of devices when operated at or near room temperature are acceptable; however, when used in a heated atmosphere filled with vapors, gases, smokes and particles, the windows, lenses or mirrors become fouled or coated with condensates and deposits. The result is that the coating changes the readings which decreases the accuracy of the device. Other noncontact-type pyrometers use a hot junction of thermocouple wires in the vicinity of the substrate. Temperature readings of the prior art pyrometers having a hot junction do not correlate with the actual temperature of the substrate and, therefore, are not reliable. For example, differences of up to about 80° F. (26° C.) have been measured between the recorded temperature of a noncontact-type pyrometer having a hot junction positioned adjacent a glass ribbon and a contact-type pyrometer.

In the prior art, there are taught devices for measuring heat flux of a heated body. One of these devices known as slug-type sensors include a hot junction mounted on a surface of a heat absorbing element. The element is mounted in spaced relation to a body being heated to measure heat flux. Although the slug-type sensors are acceptable for measuring heat flux, they are not acceptable for measuring temperature of heated bodies at thermal equilibrium. One of the reasons is that the reduction of data is difficult because it requires taking slopes of temperature histories.

A further discussion of prior art devices for measuring heat flux may be found in "American Society For Testing and Materials Committee E-21 on Space Simulation" submitted in January, 1969, by C. E. Brookley and in the February, 1968, issue of "Instrumentation Technology" on pages 51-56 in an article by D. R. Hornbaker and D. L. Rall entitled "Heat Flux Measurement: A Practical Guide".

From the above discussion of the prior art heat measuring devices, it can now be appreciated that it would be advantageous to have a noncontacting-type pyrometer that does not have the drawbacks of the prior art devices.

SUMMARY OF THE INVENTION

This invention relates to a method of measuring the temperature of a substrate, e.g., a glass ribbon, by mounting a heat absorbing member having a major surface of a predetermined configuration and dimensions a predetermined spaced distance from the substrate. After at least the major surface of the heat absorbing member and the substrate reach thermal equilibrium, the temperature of a preselected region of the member is measured.

BRIEF DESCRIPTION OF THE DRAWING

FIG. 2 is an exploded view having portions removed for purposes of clarity of the pyrometer of the instant invention mounted above the glass ribbon;

FIG. 3 is a view taken along lines 3—3 of FIG. 2;

FIG. 4 is a view taken along lines 4—4 of FIG. 2;

FIG. 5 is a view similar to the view in FIG. 2 showing another embodiment of the instant invention; and FIG. 6 is a view taken along lines 6—6 of FIG. 5.

DESCRIPTION OF THE INVENTION

Figure 1:
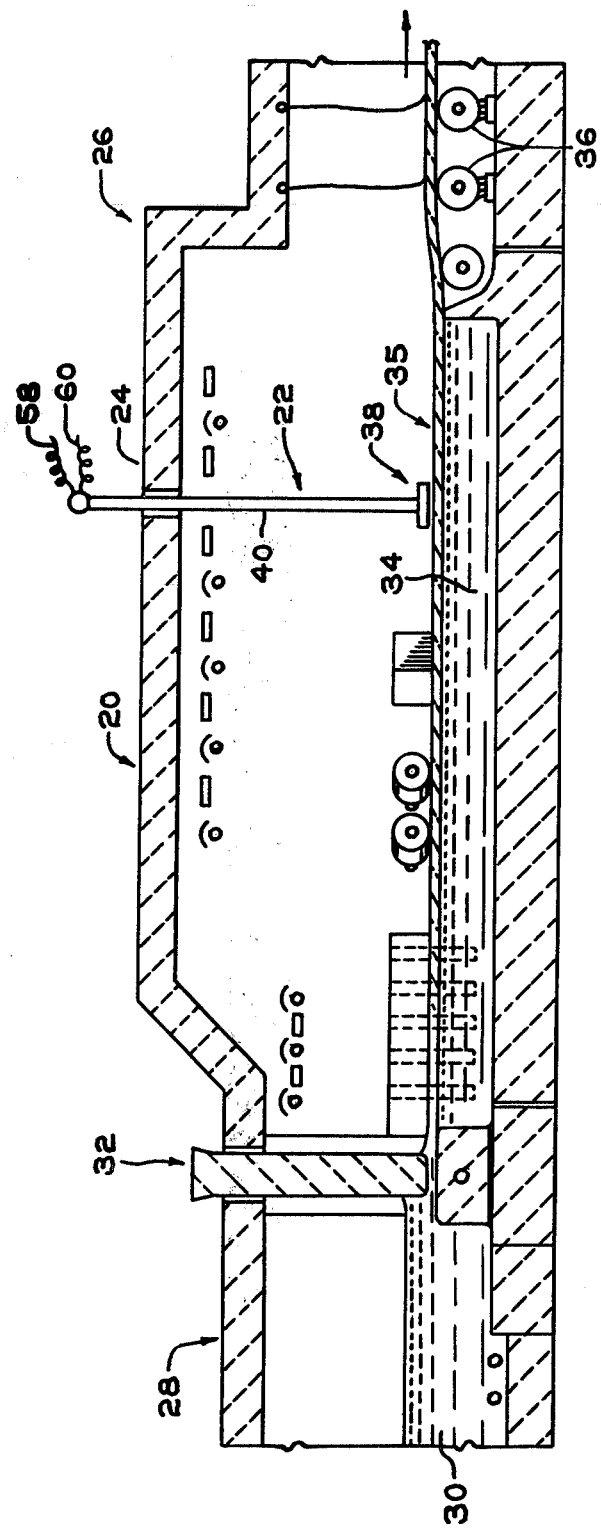
FIG. 1 is a longitudinal sectional view of a glassmaking apparatus using the pyrometer of the instant invention mounted above a glass ribbon.

With reference to FIG. 1, there is shown a flat glassmaking apparatus 20 of the type known in the art, e.g., taught in U.S. Pat. Nos. 3,083,551 or 3,843,346, having pyrometer 22 of the instant invention mounted through roof 24 of forming chamber 26 in any conventional manner. In the following discussion, the temperature of a heated glass ribbon is sensed or measured by the pyrometer 22 to illustrate an environment in which the invention may be practiced. For example, the temperature of the ribbon may be measured to determine if the temperature of the ribbon as it moves through the temperature sizing range is acceptable. If it is not, processes changes may be made. For a discussion of the sizing temperature range, reference may be had to U.S. Pat. No. 3,930,829 which teachings are hereby incorporated by reference. However, the invention is not limited thereto and may be used to monitor or measure the temperature of any type of substrate, e.g., ceramics, glass-ceramics, metal or plastic. Further, the substrate may be supported or advanced on a conveyor which may be mounted in an annealing lehr.

In general, the flat glassmaking apparatus 20 contains a pool 30 of molten glass in a refining and conditioning zone 28. The glass flows from the zone 28 through discharge facilities 32 onto a pool of molten metal 34 contained in the forming chamber 26. The molten glass moving through the forming chamber 26 on the pool 34 of molten metal cools to form a dimensionally stable glass ribbon 35. The glass ribbon 35 exits the forming chamber 26 on lift out rolls 36 and moves through an annealing lehr (not shown). A complete discussion of the flat glassmaking apparatus 20 shown in FIG. 1 may be had by referring to U.S. Pat. No. 3,843,346 which teachings are hereby incorporated by reference.

With reference to FIGS. 2–4, the pyrometer 22 has a temperature sensing head 38 mounted in any conventional manner on hollow rod 40 to support the head 38 over the glass ribbon. For example, mounting plate 42 of the sensing head 38 has internally threaded collar 44 threaded onto shaft end 46. The mounting plate 42 may be made of any rigid material, e.g., ceramic, metal or graphite. Layer 48 of thermal insulating material is contained or compressed between surface 50 of the mounting plate 42 and heat absorbing element 54 in any conventional manner, e.g., by wires or by screws 56 (as shown in FIGS. 2 and 4) to minimize heat loss or gain of the element 54 for reasons discussed below. Thermocouple wires 58 and 60 of the type used in the art are electrically isolated within the support rod 40 and hole 62 in the mounting plate 42 by double bored ceramic tubing 63. The wires 58 and 60 outside of the tube 63 have their course over a layer 64 of electrically insulating material mounted on surface 65 of element 54; through holes 66 and 68, respectively, and beneath surface 70 of the heat absorbing element 54 with hot junction 72 preferably at the center of the element 54. The thermocouple wires 58 and 60 are not limiting to the invention and are selected depending on the expected temperature range of the ribbon 35. The thermocouple wires 58 and 60 and hot junction 72 are preferably embedded in the element 54 in any conventional manner to protect the wires from gases and/or vapors in the atmosphere and to provide a more accurate temperature sensing of the element 54 for reasons to be discussed below. The layer 64 of the electrically insulating material mounted on the element surface 65 is not limiting to the invention but is recommended to minimize electrical shorting when the element is made of an electrically conductive material, e.g., graphite. Although not shown, the wires 58 and 60 may be electrically insulated up to the hot junction 72.

The heat absorbing element 54 is spaced above the glass ribbon and is heated by the glass ribbon. At thermal equilibrium, the element 54 is approximate at the temperature of the ribbon. Therefore, the hot junction 72 sensing the temperature of the element 54 is indicating the temperature of or approximately the temperature of the ribbon. The term "thermal equilibrium" as used herein is defined as that condition when the temperature of the receiving body, e.g., element 54 or glass ribbon 35 achieves at least about 95% of a temperature step change of a radiating body, e.g., the glass ribbon 35 or element 54, respectively, and/or that condition when there is a state of thermal balance between the receiving body and radiating body. A "step change" is defined as the increase or decrease in temperature of a body from a stable condition.

As can now be appreciated, the faster the element 54 reaches thermal equilibrium with the ribbon 35, the faster acceptable temperature measurements can be taken, and the smaller the temperature difference between the element 54 and glass ribbon 35 at thermal equilibrium, the closer the recorded temperature is to the actual ribbon temperature. It has been found that the time required for the element 54 and glass ribbon 35 to reach thermal equilibrium is related to (1) the absorptivity coefficient of the element 54; (2) the heat loss or gain, i.e., the heat transfer, of the element 54 through its surfaces (3) the spaced distance between the element 54 and glass ribbon 35; and (4) the thickness of the element 54. It has been found that increasing the absorptivity coefficient of the element 54 while maintaining the remaining parameters constant decreases the time required for the elements 54 and ribbon 35 to reach thermal equilibrium and vice versa. A material that is recommended in the practice of the invention is graphite which has an absorptivity coefficient of about 1. The use of graphite is acceptable in a reducing atmosphere such as the type normally found in the forming chambers of flat glassmaking apparatuses. However, the use of graphite is not recommended in an oxidizing atmosphere of the type normally found in annealing lehrs because the oxidizing atmosphere deteriorates the graphite. Therefore, if the pyrometer of the instant invention is used in an oxidizing atmosphere, it is recommended that the element 54 be made of a nonoxidizing material, e.g., silicon carbide, which has an absorptivity coefficient of at least greater than about 0.95. In the practice of the invention, it is recommended but not limiting thereto that the element 54 have an absorptivity coefficient of at least greater than about 0.90 to minimize the time required for the element 54 and glass ribbon 35 to reach thermal equilibrium.

As the heat transfer of the element 54 through its surface 65 and peripheral surface 76 increases with the remaining parameters remaining constant, the time required for the element 54 and glass ribbon 35 to reach thermal equilibrium increases and vice versa. As the spaced distance between the element 54 and glass ribbon 35 increases while the remaining parameters remain constant, the time required for the element 54 and glass ribbon 35 to reach thermal equilibrium increases and vice versa. As the thickness of the element 54 increases while the remaining parameters are kept constant, the time required for the element 54 and the glass ribbon 35 to reach thermal equilibrium increases and vice versa.

The temperature difference between the element 54 and glass ribbon 35 at thermal equilibrium is believed to be effected by (1) the spaced distance between the hot junction 72 and glass ribbon 35; (2) the spaced distance between the hot junction 72 and peripheral surface 76 of the element 54; (3) the thickness of the element 54; and (4) heat transfer through peripheral surface 76 and surface 65 of the element 54.

For purposes of the following discussion and unless indicated otherwise, the hot junction 72 embedded in the element 54 is sufficiently near the element surface 70 such that it is considered to be at the element surface 70. Variations in the spaced distance between the element surface 70 and the glass ribbon 35 are considered to have an effect on the temperature difference between the element 54 and glass ribbon 35 at thermal equilibrium because increasing the spaced distance decreases the effect of heat radiating from the glass ribbon on the element 54 and vice versa. Variations in the spaced distance between the hot junction 72 and the peripheral surface 76 of the element 54 are considered to have an effect on temperature difference at thermal equilibrium because the closer the hot junction is to the peripheral surface 76, the greater the effect of side heating and cooling on the region of the element sensed by the hot junction 72. It is believed, however, that the parameters of (1) the spaced distance between the element 54 and glass ribbon 35 and (2) the spaced distance between the hot junction 72 and peripheral surface 76 of the element 54 are interrelated and, therefore, may be defined by a thermal aspect ratio. The spaced distance between the element 54 and glass ribbon 35 and the spaced distance between the hot junction 72 and peripheral surface 76 is believed to be interrelated because as the element 54 approaches the glass ribbon 35, the heat of the glass ribbon 35 overcomes heat loss or gain through the peripheral surface 76 of the element 54 thereby reducing the effect of the spaced distance between the hot junction and the peripheral surface of the element. On the other hand, as the spaced distance between the element 54 and glass ribbon 35 increases, the effect of heat loss or gain through the peripheral surface 76 of the element 54 increases and the effect of the spaced distance between the hot junction 72 and peripheral surface 76 of the element 54 increases.

As used herein and in the claims, "thermal aspect ratio" is defined as the ratio between (1) the distance between the hot junction 72 and closest adjacent peripheral surface 76 of the element 54 and (2) the spaced distance between the element surface 70 and the glass ribbon surface 74 (see FIG. 2). A better appreciation of the thermal aspect ratio may be had from the following examples. In the first example, the hot junction 72 is at the center of a circular disk having a diameter of 7 inches (17.78 centimeters) and the distance between element surface 70 and glass ribbon surface 74 is 0.5 inch (1.27 centimeters), the thermal aspect ratio is $$\frac{3.5 \text{ inches}}{0.5 \text{ inch}} \quad \frac{(8.89 \text{ centimeters})}{(1.27 \text{ centimeters})}$$

or 7 where 3.5 inches (8.89 centimeters) is the distance between the hot junction 72 and the closest peripheral surface 76 of the element 54, i.e., the radius of the element surface 70 and 0.5 inch (1.27 centimeters) is the spaced distance between the element surface 70 and ribbon surface 74. Consider the above example with the hot junction 72 spaced 2 inches (5.08 centimeters) from a peripheral surface 76 of the element 54. The thermal aspect ratio is $$\frac{2 \text{ inches}}{0.5 \text{ inch}} \quad \frac{(5.08 \text{ centimeters})}{(1.27 \text{ centimeters})}$$

or 4.

In the following example, the hot junction 72 is in the center of the element surface 70 and the surface 70 has a square configuration with sides of 8 inches (20.32 centimeters). The spaced distance between the element surface 70 and glass ribbon surface is 0.5 inches (1.27 centimeters). The thermal aspect ratio is $$\frac{4.0 \text{ inches}}{0.5 \text{ inch}} \quad \frac{(10.16 \text{ centimeters})}{(1.27 \text{ centimeters})}$$

or 8 where 4.0 inches (10.16 centimeters) is the distance between the hot junction 72 and the closest peripheral surface 75 of the element 54 and 0.5 inch (1.27 centimeters) is the spaced distance between the element surface 70 and glass ribbon surface 74. If the hot junction is spaced 2 inches from a peripheral surface 76 and the spaced distance between the glass ribbon surface 74 and element surface 70 is 1 inch (2.54 centimeters), the ratio decreases to $$\frac{2 \text{ inches}}{1 \text{ inch}} \quad \frac{(5.08 \text{ centimeters})}{(2.54 \text{ centimeters})}$$

or 2.

As can be appreciated, the invention is not limited to the configuration of the element 54. However, it is recommended that the element 54 have symmetry with the hot junction 72 in the center thereof.

In the practice of the invention, thermal aspect ratios of at least about 0.5 are acceptable, but it is recommended that thermal aspect ratios of at least about 2 be used to minimize the temperature difference at thermal equilibrium between the element 54 and the glass ribbon 35.

The effect of heat transfer through peripheral surface 76 and surface 65 of the element 54 is effected by the thermal insulating material 48. Decreasing the heat transfer through peripheral surface 76 and surface 65 of the element 54 by thermal insulating material while the remaining parameters are kept constant decreases the temperature difference between the element 54 and glass ribbon 35 at thermal equilibrium. Heat transfer through peripheral surface 76 of the element 54 is also effected by the thickness of the element 54. As the thickness of the element 54 increases, the effect of heat loss or gain on the peripheral surface 76 increases because the surface area through which heat transfer can occur increases and vice versa. As was discussed supra, the effect of heat loss or gain through the peripheral surface 76 also has an effect on the spaced distance between the hot junction 72 and peripheral surface 76 of the element 54 which in turn can be effected by the spaced distance between the glass ribbon 35 and element 54.

It has been found that the temperature difference between the element 54 and glass ribbon 35 is minimized to an acceptable level of about 10° when the thermal aspect ratio is at least about 5 times the thickness of the element 54. Since the element thickness and spaced distance between the hot junction 72 and peripheral surface 76 of the element 54 are fixed and the spaced distance between the element surface 70 and glass ribbon 35 can be varied, the above may be stated by the following equation:

$$b < a/5c$$

where a is the minimal spaced distance between the hot junction 72 and peripheral surface 76 of the element 54 in inches (centimeters);

b is the spaced distance between the hot junction 72 and glass ribbon surface 74 or surface 70 of the element 54 and glass ribbon surface 74 in inches (centimeters);

c is the thickness of the element 54 as measured between the surfaces 70 and 65 in inches (centimeters); and a/b is the thermal aspect ratio.

As a/5c becomes greater than b, the temperature difference at thermal equilibrium between the temperature measured by the hot junction 72 and the temperature of the glass ribbon decreases and vice versa.

With reference to FIGS. 5 and 6, there is shown another embodiment of a noncontacting-type pyrometer 84 incorporating features of the instant invention. The pyrometer 84 has a metal plate 86 mounted, e.g., as by welding to the support rod 40. The layer 48 of thermal insulating material is compressed or contained between surface 87 of the plate 86 and surface 88 of heat absorbing element 89 by the screws 56. A sheathed thermocouple 90, e.g., of the type sold by Martin Manufacturing Corporation of Cleveland, Ohio, has its course through the rod 40, through the insulator layer 48, over the surface 88 of the element 89, around notch 91 formed in element periphery 92 and through hole 94 formed in the element 89.

As can now be appreciated, other embodiments of the noncontacting-type pyrometer of the instant invention can be made within the scope of the instant invention.

DETAILED DESCRIPTION OF THE INVENTION

With reference to FIG. 1, pyrometer 22 of the instant invention is used to sense temperature of glass ribbon 35 moving on molten metal 34 through forming chamber 26 of flat glassmaking apparatus 20. The flat glassmaking apparatus 20 is of the type taught in U.S. Pat. No. 3,843,346 and reference may be had thereto for a complete discussion thereof.

Referring to FIG. 2, internally threaded collar 44 of graphite mounting plate 42 is threaded onto end 46 of hollow shaft 40 made of 1 inch (2.54 centimeters) diameter SCH 40 stainless steel pipe having a length sufficient to extend through the roof 24 of the forming chamber 26 to about ½ inch (1.27 centimeters) above surface 74 of the glass ribbon 35. The collar 44 having an outside diameter of about 2⅜ inches (6.033 centimeters), a wall thickness of about 11/16 inch (1.45 centimeters) and a height of about 1 inch (2.54 centimeters) has its center coincident with center of circular plate 80 of the plate 42. The plate 80 has a thickness of about ½ inch (1.27 centimeters) and a diameter of about 4 inches (10.16 centimeters). Hole 62 having a diameter of about ½ inch (1.27 centimeters) extends through the plate 80 to provide communication between surface 50 of the mounting plate 42 and collar 44 for passing double bored mullite tube 63 of the type used for electrically isolating thermocouple wires.

A chromium wire 58 and aluminum wire 60 are mounted in the tube 48. The wires 58 and 60 exit the tube 63 and pass over Fiberfax ® insulating paper 64 mounting on surface 65 of graphite element or block 54 for a distance of about 1 inch (2.54 centimeters). The block 54 has a diameter of about 3½ inches (8.89 centimeters) and a thickness of about ¼ inch (0.635 centimeter). The wires 58 and 60 have their course through holes 66 and 68, respectively, adjacent surface 70 of the block 54 and are joined in any conventional manner at the center of the block 54 to form hot junction 72. The wires 58 and 60 are embedded in the block 54 by cutting a groove (not shown) having a depth twice the diameter of the wires 58 and 60 in the block surface 70. The wires 58 and 60 and hot junction 72 are placed in the groove after which the remaining portion of the groove is filled with graphite cement of the type used in the art. About a 1 inch (2.54 centimeters) thick layer 48 of thermal insulating material having a value of 1.4 BTU inch/ft-².°F. (11.13 watts/meter²kelvin) is mounted between the block 54 and mounting plate 38. The layer 48 is compressed to about ½ inch (1.27 centimeters) thickness by screws 56 with a portion of the layer 48 extending over block periphery 78 as shown in FIGS. 2 and 4.

The temperature of the glass ribbon passing through a specific region of the forming chamber was measured at 1816° F. (991.1° C.) using a contact-type pyrometer. The pyrometer 22 was mounted in the same region of the forming chamber with the block surface 70 spaced about ½ inch (1.27 centimeters) from the glass ribbon surface 74 (see FIG. 2) to provide a thermal aspect ratio of about $$\frac{1.75 \text{ inches}}{0.5 \text{ inch}} \quad \frac{(4.45 \text{ centimeters})}{(1.27 \text{ centimeters})}$$

or 3.5. After 10 minutes, the pyrometer 22 was thermally stable and recorded a temperature of about 1810° F. (987.8° C.). This is a temperature variation of 0.33% and is considered an acceptable temperature difference between the glass ribbon and element 54 for monitoring temperature of a glass ribbon moving through a forming chamber.

The temperature in the similar region of the forming chamber was measured using a hot junction spaced about ½ inch (1.27 centimeters) above the glass ribbon surface 74. At equilibrium, a temperature of about 1735° F. (946.1° C.) was recorded. Thereafter, the ribbon passing through the region was contacted with a hot junction, and a reading of 1816° F. (991.1° C.) was again recorded. The temperature difference between the contacting pyrometer and the hot junction spaced above the glass ribbon was 81° F. (27.2° C.) for a difference of greater than 4% which is not acceptable.

As can be appreciated, the above example is presented for illustration purposes and is not limiting to the invention. Further, variations to the invention may be made without deviating from the scope thereof.

What is claimed is:

1. A noncontacting method of measuring temperature of a sheet, comprising the steps of:
   providing a heat absorbing member having an essentially flat major surface and adjacent peripheral surface portions;
   mounting the major surface of the member a spaced distance from the sheet; and
   measuring the temperature of a preselected region of the member adjacent the major surface of the member when the member and the sheet are at thermal equilibrium wherein thermal aspect ratio defined as the ratio of (1) the spaced distance between the preselected region of the member and closest peripheral surface portion of the member and (2) the spaced distance between the member and the sheet is at least about 0.5.

2. The method as set forth in claim 1 wherein the thermal aspect ratio is at least about 3.5.

3. The method as set forth in claim 1 wherein said mounting step includes the step of:
   positioning the major surface of the member adjacent the sheet.

4. The method as set forth in claim 1 wherein the step of measuring the temperature of the preselected region includes the step of:
   contacting the preselected region with hot junction of thermocouple wires.

5. The method as set forth in claim 3 wherein the major surface of the member is a first surface and the member further includes a second opposite surface, further including the step of:
   reducing heat loss from the second surface of the member.

6. The method as set forth in claims 1 or 4 wherein (1) the spaced distance (a) between the preselected region and the distance to the closest peripheral surface portion of the member; (2) thickness (c) of the member; and (3) spaced distance (b) between the preselected region of the member and the sheet satisfy the equation b<a/5c.

7. The method as set forth in claim 6 wherein the sheet is a glass ribbon and further including the step of:
   supporting the glass ribbon on a molten metal bath contained in a forming chamber;
   advancing the ribbon through the forming chamber; and
   making process changes in the manufacture of the glass ribbon in response to said measuring step.

* * * * *